United States Patent [19]
Wakabayashi

[11] Patent Number: 5,664,250
[45] Date of Patent: Sep. 2, 1997

[54] LID FOR A FILM CARTRIDGE CHAMBER

[75] Inventor: Tsutomu Wakabayashi, Yokohama, Japan

[73] Assignee: Nikon Corporation, Tokyo, Japan

[21] Appl. No.: 513,555

[22] Filed: Aug. 10, 1995

[30] Foreign Application Priority Data

Oct. 31, 1994 [JP] Japan .................. 6-267150

[51] Int. Cl.$^6$ .................................. G03B 17/02
[52] U.S. Cl. .................................. 396/538
[58] Field of Search .................. 354/212, 214, 354/173.1, 174, 288; 396/535, 538

[56] References Cited

U.S. PATENT DOCUMENTS 5,422,695  6/1995  Katagiri .................. 354/173.1

Primary Examiner—Howard B. Blankenship
Attorney, Agent, or Firm—Oliff & Berridge

[57] ABSTRACT

A lid for a film cartridge chamber that can open and close in the direction of the spool shaft of a film cartridge that is loaded into a cartridge chamber. The lid of the cartridge chamber includes a movable component attached so as to be able to advance into or retract from a loading/extraction path of the film cartridge when the lid is opened to a position at which the film cartridge can be extracted from the cartridge chamber. The movable component is acted upon by a forcing component so as to advance the movable component into the loading/extraction path.

20 Claims, 5 Drawing Sheets

LID FOR A FILM CARTRIDGE CHAMBER

BACKGROUND OF THE INVENTION

1. Field of the Invention

The invention relates to a lid for a film cartridge chamber that covers the cartridge chamber of a camera or the like. More particularly, the invention relates to a film cartridge chamber lid that opens and closes in the direction of a spool shaft of a film cartridge loaded into the cartridge chamber and that prevents the film cartridge from falling out when the lid is opened.

2. Description of Related Art

So-called drop-in loading-type cameras, in which a film cartridge is loaded in the direction of a spool shaft of the cartridge, are introduced, for example, in Japanese Laid-Open Patent Application No. 5-150343. With this type of camera, a cartridge chamber lid is provided on a bottom surface of the camera. However, when the cartridge chamber lid is provided on the bottom surface of the camera, the lid supports the weight of the film cartridge. Therefore, if the lid is opened carelessly, the film cartridge will fall out.

There is therefore a need for a film cartridge chamber lid that does not result in undesired falling out of the film cartridge.

SUMMARY OF THE INVENTION

It is an object of the present invention to provide a film cartridge chamber lid that can prevent the film cartridge from falling out.

This and other objects are achieved by the claimed invention in which a lid for a film cartridge chamber is provided with a movable component that is able to advance into or retract from a loading/extraction path of the film cartridge when the lid is opened. The movable component is acted upon by a forcing component so as to advance the movable component into the loading/extraction path. Additionally, when the lid is closed, the movable component can come into contact with the film cartridge that has been loaded into the cartridge chamber and can push the cartridge into a specific position due to the force of the forcing component.

When the lid is opened to a position at which the film cartridge can be extracted from the cartridge chamber, the movable component is pushed by the forcing component into the loading/extraction path of the film cartridge. Therefore, the movable component extends into the path of the film cartridge and prevents the film cartridge, which would otherwise fall out of the chamber due to gravitational forces, from falling. When the movable component is caused to retract from the loading/extraction path of the film cartridge, in opposition to the forcing component, the film cartridge can then be extracted.

For example, when the movable component is caused to retract from the loading/extraction path of the film cartridge by a hand of an operator, the hand operating the movable component advances into the loading/extraction path of the film cartridge. Thus, the hand is positioned to receive the cartridge, preventing the film cartridge from falling.

BRIEF DESCRIPTION OF THE DRAWINGS

The invention will be described in detail with reference to the following drawings, wherein.

DETAILED DESCRIPTION OF A PREFERRED EMBODIMENT

Figure 1:
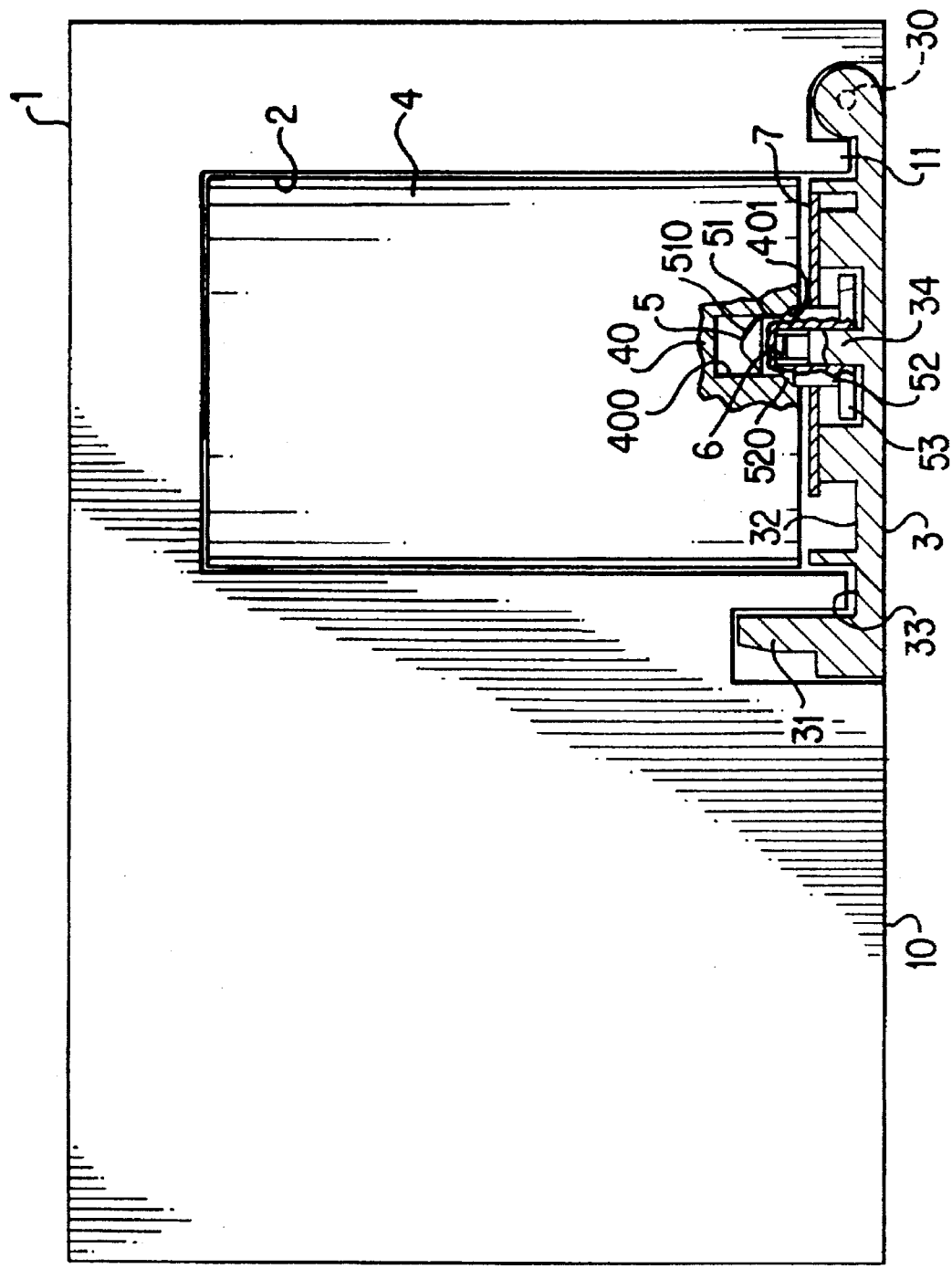
FIG. 1 is a cross-sectional view illustrating a cartridge chamber of a camera that is provided with a lid according to the present invention.

An embodiment of the present invention is described hereafter with reference to FIGS. 1–5. FIG. 1 is a cross-sectional view illustrating a cartridge chamber of a camera that is provided with a lid according to the present invention. In this Figure, 1 is a camera body and 2 is a cartridge chamber. Hereafter, for the sake of convenience, the top and bottom of FIG. 1 are considered to be the top and bottom of the camera. The cartridge chamber 2 opens at a bottom surface 10 of the camera body. A lid 3 is attached at the opening of the cartridge chamber 2 and is rotatable about a hinge shaft 30.

Reference numeral 4 is a film cartridge. A spool shaft 40, which winds in the film (not shown), is provided in the center of the film cartridge 4. Connecting sockets 400, which have the same axis as an outer surface of the spool shaft, are provided at both ends of the spool shaft 40. To simplify the drawings and because such connecting sockets are well known in the art, only the connecting socket of the lower end of the spool shaft 40 is shown. Tapered surfaces 401 (FIG. 3) are formed at open ends of the connecting sockets 400.

In this type of film cartridge, even when the film of the film cartridge 4 has not yet been exposed, the leading end of the film does not stick out of the cartridge. Rather, the film is fed out through rotation of the spool shaft 40. Thus, the leading end of the film does not become a hindrance when the film cartridge 4 is loaded into the cartridge chamber 2 along the direction of the spool shaft 40, which is optimal for drop-in loading. This type of film cartridge is introduced, for example, in Japanese Laid-Open Patent Application No. 5-241234.

A key 31 is provided on the lid 3, on the side opposite the hinge shaft 30. When the lid 3 is closed to the position shown in FIG. 1, key 31 connects with a key component (not shown) on the camera body 1, and the lid 3 is locked in this position. When a release knob (not shown) is operated, the connection between the key 31 and the camera body 1 is released, and the lid 3 can be opened. This type of locking mechanism is introduced, for example, in Japanese Laid-Open Patent Application No. 5-40298.

A groove 33 is provided on an inside surface 32 of the lid 3 surrounding a holding shaft 5, which will be described hereafter. A ring-shaped ridge 11 is provided on the bottom surface 10 of the camera body 1 surrounding the opening of the cartridge chamber 2. When the lid 3 is closed, the ring-shaped ridge 11 and the groove 33 interconnect forming a labyrinth seal. Thus, light shielding characteristics of the cartridge chamber 2 can be improved.

Figure 2:
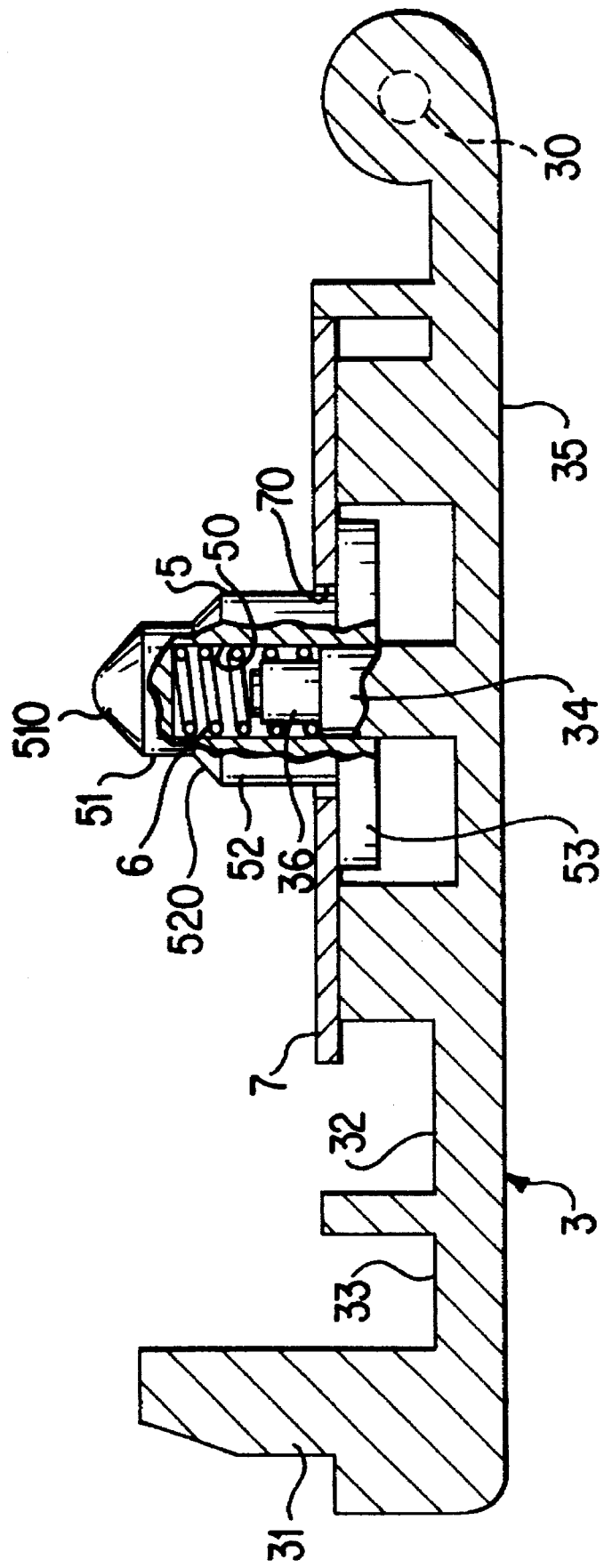
FIG. 2 is an enlarged view illustrating the cartridge chamber lid of FIG. 1.

As better shown in FIG. 2, a shaft 34 is formed at the center of the lid 3. This shaft 34 and a connecting socket 50 of the holding shaft 5 interconnect, allowing free movement in an up-and-down direction. The holding shaft 5 establishes a bottom end position of the spool shaft 40. A connecting shaft component 51, which can mate with the connecting socket 400 of the spool shaft 40, is formed at the leading end of the holding shaft 5. A first tapered surface 510 having a spherical shape and a rounded tip is formed on a top end of the connecting shaft component 51. An enlarged diameter component 52 is formed on a bottom end of the connecting shaft component 51. A second tapered surface 520, which decreases in diameter in a direction facing the connecting shaft component 51, is formed at a top end of the enlarged diameter component 52.

The holding shaft 5 is continually forced in a direction extending out from the lid 3 by a coil spring 6 that is installed inside the connecting socket 50. A flange 53 is formed on a bottom end of the holding shaft 5, and a restraining plate 7 is positioned above the flange 53. Restraining plate 7 can be affixed to the lid 3 by any suitable connecting component (not shown), such as a screw. Thus, the flange 53 and the restraining plate 7 come into contact, and movement of the holding shaft 5 by the coil spring 6 is restricted by the restraining plate 7. When the holding shaft 5 is pushed in opposition to the coil spring 6, movement of the holding shaft 5 is also restricted by holding shaft 5 coming into contact with the lid 3. Accordingly, moving component 5 has a determinable range of movement, and this range can be altered by the relative positioning of the lid 3 and the restraining plate 7. In order to prevent rubbing of the restraining plate 7 and the enlarged diameter component 52 when the holding shaft moves up and down, the enlarged diameter component 52 is formed with a smaller diameter than an aperture 70 in the restraining plate 7. Reference numeral 36 is a guide shaft that guides the coil spring 6.

Figure 3:
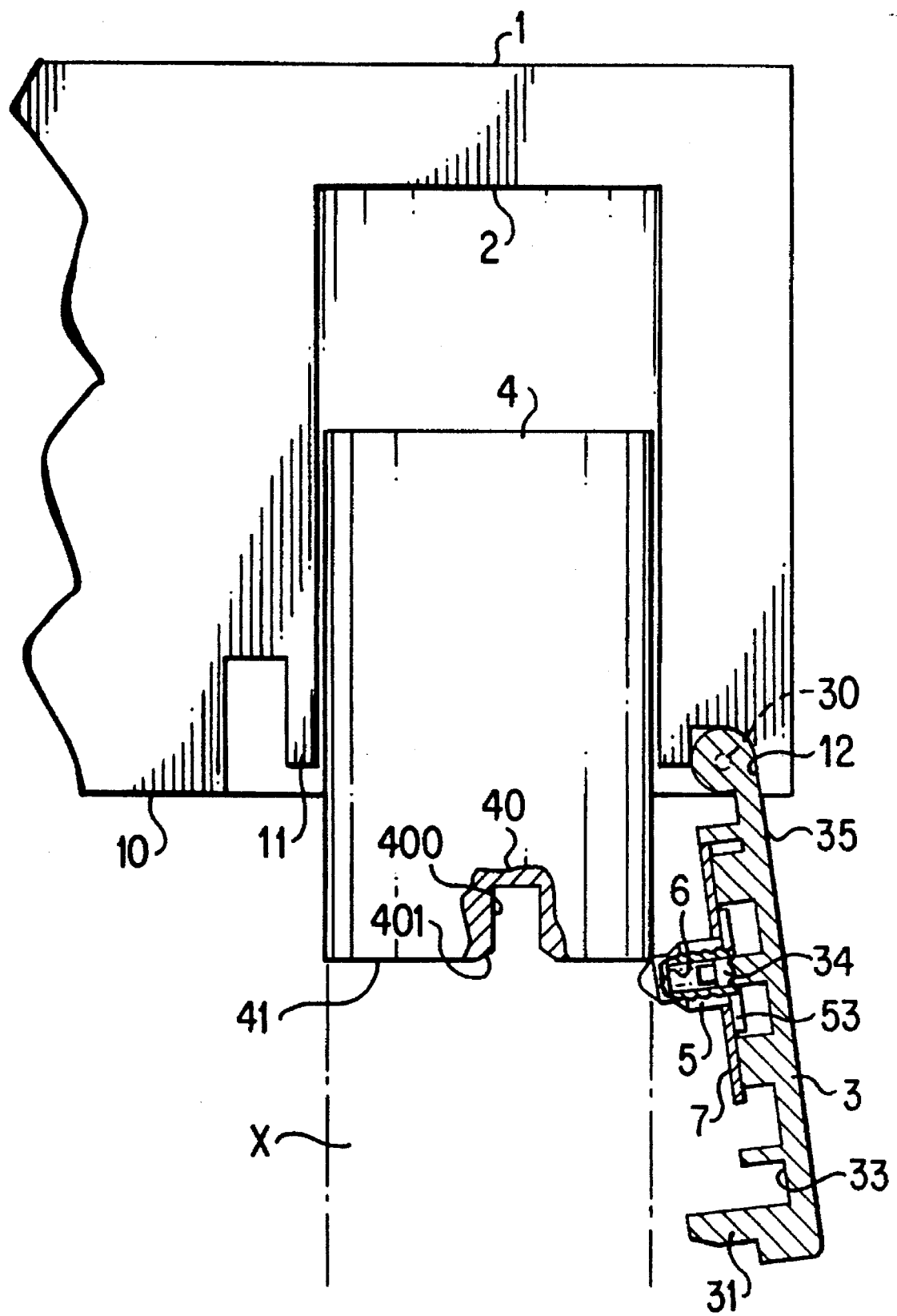
FIG. 3 is a cross-sectional view illustrating the lid of FIG. 1 in an open state.

As shown in FIG. 3, when the lid 3 is opened, a stopper surface 12 of the camera body 1 and an outer surface 35 of the lid 3 come into contact, thus restricting the opening angle of the lid 3. The maximum opening angle of the lid 3 is set so that the holding shaft 5 is able to advance into or retract from the loading/extraction path X (the hatched region in the drawing) of the film cartridge 4.

Accordingly, when the release knob is operated to release the binding of the lid 3 from the closed position, the lid 3 naturally opens (due to gravitational forces) to nearly the maximum opening angle shown in FIG. 3. The film cartridge 4 also naturally tends to fall from the cartridge chamber 2 due to gravity. However, because the holding shaft 5 is designed to protrude outwardly from the lid 3 a maximum distance when the lid 3 is in the opened state, the holding shaft 5 is advanced, due to spring 6, into the loading/extraction path X of the film cartridge, as shown in FIG. 3. Accordingly, while the film cartridge 4 starts to fall out of the cartridge chamber 2, a bottom surface 41 of the film cartridge 4 comes into contact with holding shaft 5 and retains the cartridge 4 in this position.

Figure 4:
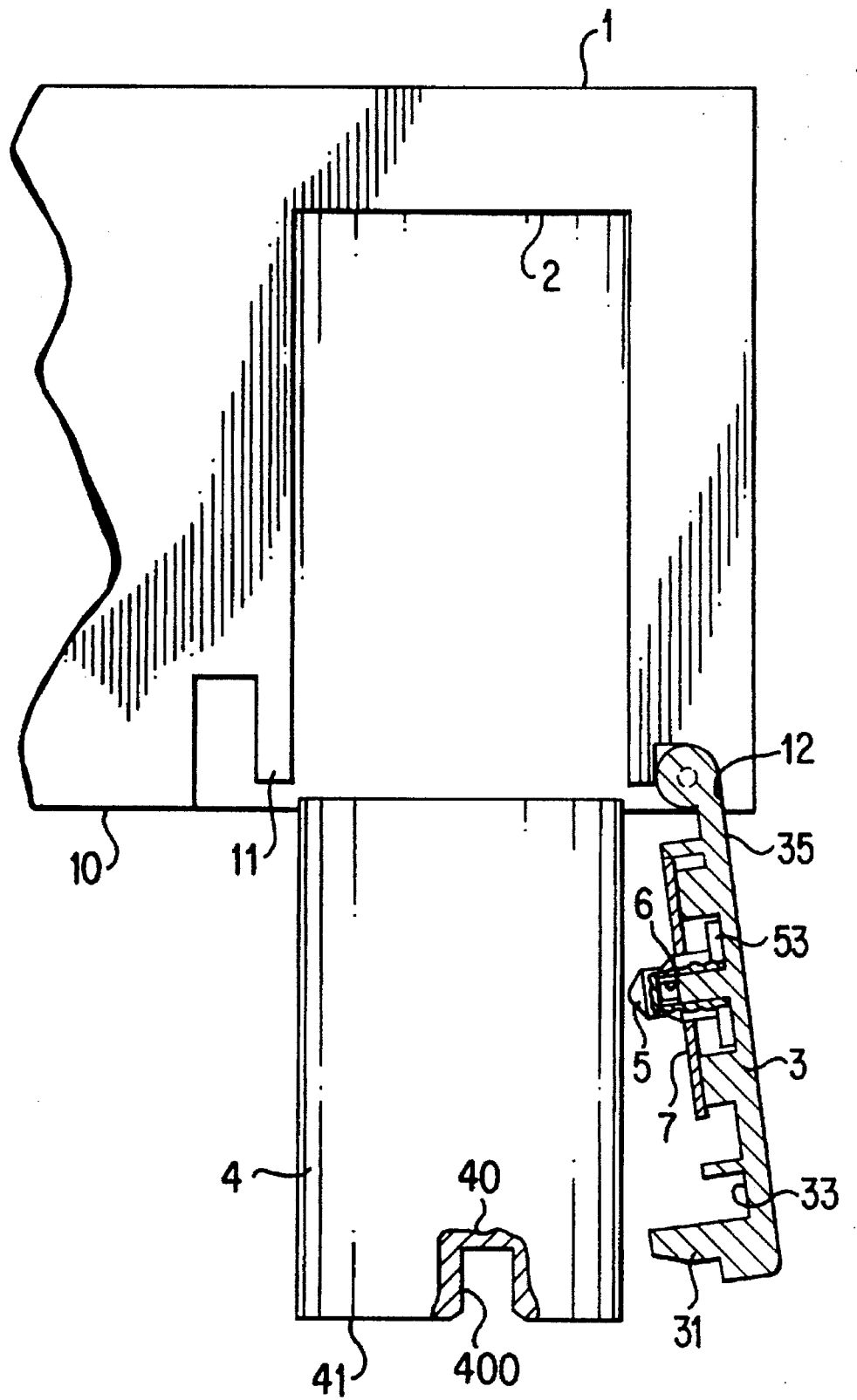
FIG. 4 is a cross-sectional view illustrating the lid of FIG. 1 in which the film cartridge has been extracted from the cartridge chamber.
Figure 5:
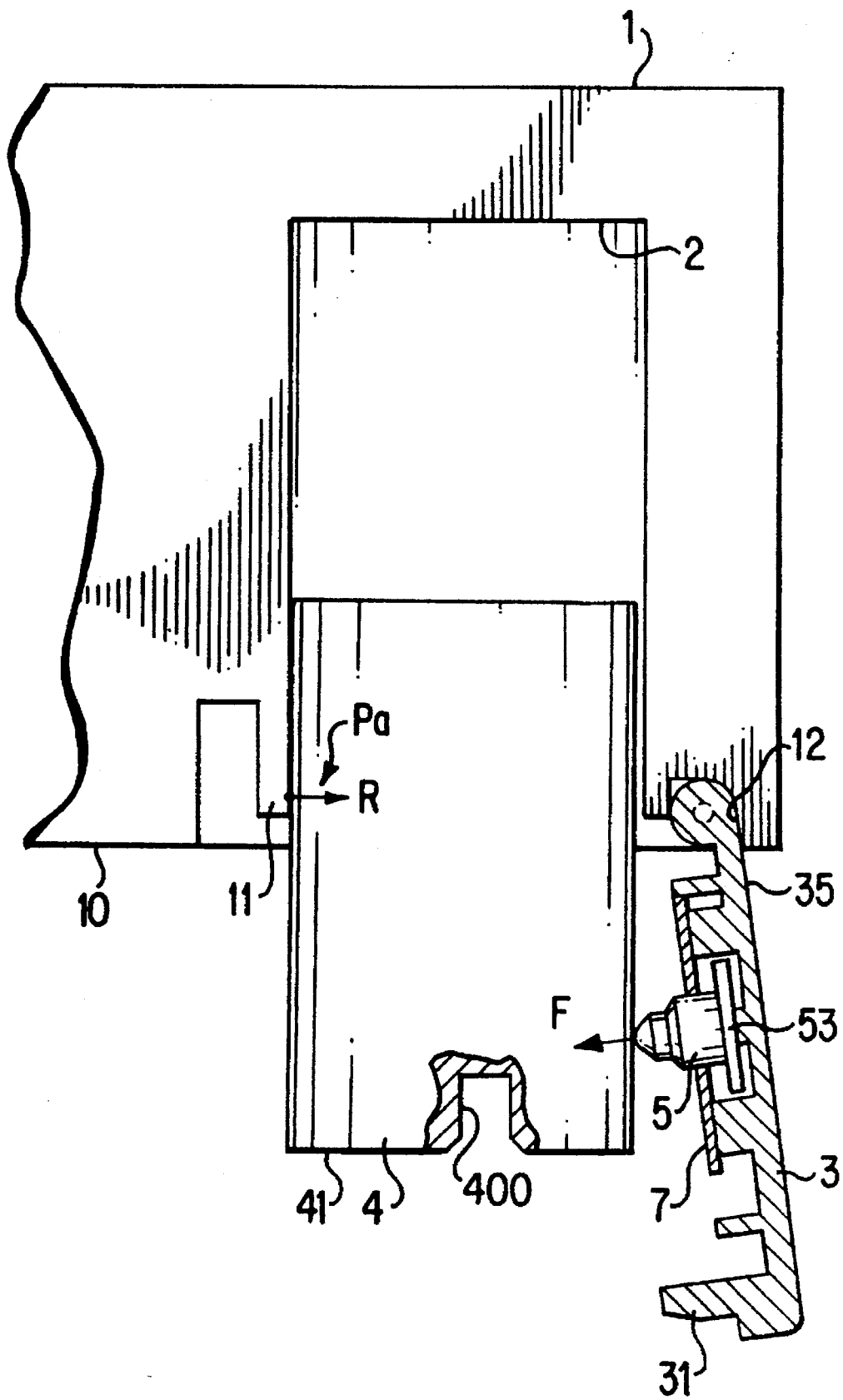
FIG. 5 is a cross-sectional view illustrating the lid of FIG. 1 in a state in which the film cartridge is in the process of being removed from the position illustrated in FIG. 3.

From the state shown in FIG. 3, the holding shaft 5 can be pushed in opposition to the coil spring 6, and the film cartridge 4 can be completely extracted from the cartridge chamber 2, as shown in FIG. 4. At this point, because the hand of an operator who is retracting the holding shaft 5, in opposition to spring 6, is blocking the loading/extraction path X, the film cartridge 4 can drop from the cartridge chamber 2 into the hand of the operator. Moreover, until the film cartridge 4 is completely removed from the cartridge chamber 2, the film cartridge 4 can be prevented from free-fall even if the hand is removed from the film cartridge 4. This is because a force F from the holding shaft 5 acts upon the film cartridge 4, as shown in FIG. 5, and an opposing force R acts between the cartridge chamber 2 and the film cartridge 4 at a contact point Pa on the side opposite the holding shaft 5. If the force of the coil spring 6 is properly set, the film cartridge 4 can be held even in the partially removed state shown in FIG. 5.

When the film cartridge 4 is loaded, the holding shaft 5 is first pushed by the operator against the force of the spring 6 so that the shaft 5 retracts from the extraction/loading path X. In this state, the film cartridge 4 is pushed into the cartridge chamber 2. If the pushing action on the holding shaft 5 is released at a point at which the bottom surface 41 of the film cartridge 4 has passed above the position of the holding shaft 5, the film cartridge 4, now positioned as shown in FIG. 3, will not fall out even if the hand is removed from the film cartridge 4 because the holding shaft 5 is advanced into the loading/extraction path X by the spring 6.

When the lid 3 is closed from the state shown in FIG. 3, the first tapered surface 510 of the holding shaft 5 comes into contact with the tapered surface 401 of the spool shaft 40, the spool shaft 40 and the holding shaft 5 are aligned, and the connecting shaft component 51 connects with the connecting socket 400.

At this point, the second tapered surface 520 comes into contact with tapered surface 401, the spool shaft 40 and the holding shaft 5 are precisely aligned, and the film cartridge 4 is pushed in an upward direction by the force of the coil spring 6. A holding shaft (not shown) forming a pair with the holding shaft 5 is provided at the top end of the cartridge chamber 2. This holding shaft connects with and comes into contact with the connecting socket at the top end of the spool shaft 40 in the axial direction. Thus, the spool shaft 40 is held between a pair of holding shafts by the force of the coil spring 6.

In the present embodiment, since the holding shaft 5 that holds the spool shaft 40 is arranged to advance into and retract from the loading/extraction path X when the lid 3 is open, the film cartridge can be prevented from falling without increasing the number of camera components.

As described above, because the film cartridge cannot be removed after the cartridge chamber lid is opened as long as the movable component attached to the lid is not forced to retract from the loading/extraction path, the film cartridge cannot fall out, even if the lid is opened carelessly. In addition, even if an operator's hand is accidentally removed from the film cartridge while loading or unloading the film cartridge, the film cartridge can be supported and will not fall out as long as the film cartridge is partially within the cartridge chamber past the movable component.

In the preferred embodiment, the holding shaft 5 comprises the movable component, the coil spring 6 comprises the forcing component, and the inside surface 32 of the lid 3 comprises the surface that faces the inside of the cartridge chamber. However, other alternative structures can be substituted. For example, a movable component can be provided in addition to and separate from the holding shaft 5. Such a movable component can be made to freely protrude into or retract from the loading/extraction path X. This moving component may be located on the inside surface 32 of the lid 3 or elsewhere. In addition, the key 31 can be made to fold over with respect to the lid 3, and thus be capable of protruding into or retracting from the loading/extraction path X through the folding operation. This folding operation (and unfolding operation) can be manually operated or may include a forcing component that forces the key 31 to an unfolded position that is within the loading/extraction path X. Accordingly, in such a structure, the folding key would function as the movable component.

Moreover, the forcing component may be replaced by a spring component other than a coil spring, such as a leaf spring, torsion spring, disc spring, or an elastic substance (rubber, elastomer or the like), provided that the replacement structure can apply a suitable force to the movable component. Additionally, the forcing component is not limited to a location on the inside surface 32 of the lid 3. A suitable forcing component could also be located elsewhere, such as on camera body 1 or about hinge 30. Such a forcing component can act on a suitable movable component through force applied to the lid 3. The present invention can also be applied to a device other than a camera, provided that the device uses a lid for a cartridge chamber that uses a drop-in loading method.

The invention has been described with reference to preferred embodiments thereof, which are illustrative and not limiting. Various changes may be made without departing from the spirit and scope of the invention as defined in the appended claims.

What is claimed is:

1. A film cartridge chamber having a lid that can open and close, the lid comprising:

a movable component movably attached to the lid and able to advance into or retract from a loading/extraction path of the film cartridge chamber when the lid is opened to a loading/extraction position at which a film cartridge can be loaded/extracted from the film cartridge chamber; and a forcing component urging the movable component into the loading/extraction path when the lid is opened to the loading/extraction position, wherein when the lid is opened as far as possible, the movable component remains advanced into the loading/extraction path by the forcing component until exertion of an opposing force that is greater than the forcing component.

2. The film cartridge chamber and lid according to claim 1, wherein the movable component is positioned to come into contact with a film cartridge loaded in the film cartridge chamber when the lid is closed.

3. The film cartridge chamber and lid according to claim 1, wherein the lid includes an inner surface that faces the film cartridge chamber when the lid is closed, and wherein retraction of the movable component from the loading/extraction path can only be performed from a side facing the inner surface.

4. The film cartridge chamber and lid according to claim 1, further comprising a hinge defining a pivot axis of the lid, the lid being pivotal about the pivot axis between open and closed positions.

5. The film cartridge chamber and lid according to claim 1, further comprising a shaft provided on an inner surface of the lid, the movable component being freely axially movable along the shaft.

6. The film cartridge chamber and lid according to claim 5, wherein the forcing component is provided around the shaft between the inner surface of the lid and the movable component.

7. The film cartridge chamber and lid according to claim 1, further comprising a restraining plate spaced away from an inner surface of the lid, the restraining plate restraining movement of the movable component.

8. The film cartridge chamber and lid according to claim 7, wherein the restraining plate defines an aperture of a predetermined size, and wherein the movable component includes a flange dimensioned larger than the aperture.

9. The film cartridge chamber and lid according to claim 1, wherein the movable component comprises a holding shaft having a connecting shaft component that is matable with a connecting socket of a film cartridge when the lid is in a closed position.

10. The film cartridge chamber and lid according to claim 1, wherein said forcing component has sufficient force to bias a partially loaded/extracted film cartridge against said film cartridge chamber to prevent the film cartridge from falling out of said film cartridge chamber.

11. A film cartridge chamber having a lid that can open and close, the lid comprising:

movable component means movably attached to the lid for advancing into or retracting from a loading/extraction path of the film cartridge chamber when the lid is opened to a loading/extraction position at which a film cartridge can be loaded/extracted from the film cartridge chamber; and forcing component means for urging the movable component means into the loading/extraction path when the lid is opened to the loading/extraction position, wherein when the lid is opened as far as possible, the movable component means remains advanced into the loading/extraction path by the forcing component means until exertion of an opposing force that is greater than the forcing component means.

12. The film cartridge chamber and lid according to claim 11, wherein the movable component means is positioned to come into contact with a film cartridge loaded in the film cartridge chamber when the lid is closed.

13. The film cartridge chamber and lid according to claim 11, wherein the lid includes an inner surface that faces the film cartridge chamber when the lid is closed, and wherein retraction of the movable component means from the loading/extraction path can only be performed from a side facing the inner surface.

14. The film cartridge chamber and lid according to claim 11, further comprising a hinge defining a pivot axis of the lid, the lid being pivotal about the pivot axis between open and closed positions.

15. The film cartridge chamber and lid according to claim 11, further comprising shaft means provided on an inner surface of the lid, the movable component means being freely axially movable along the shaft means.

16. The film cartridge chamber and lid according to claim 15, wherein the forcing component means is provided around the shaft means between the inner surface of the lid and the movable component means.

17. The film cartridge chamber and lid according to claim 11, further comprising restraining means spaced away from an inner surface of the lid for restraining movement of the movable component means.

18. The film cartridge chamber and lid according to claim 17, wherein the restraining means defines an aperture of a predetermined size, and wherein the movable component means includes a flange dimensioned larger than the aperture.

19. The film cartridge chamber and lid according to claim 11, wherein the movable component means comprises holding shaft means having connecting shaft component means for mating with a connecting socket of a film cartridge when the lid is in a closed position.

20. The film cartridge chamber and lid according to claim 11, wherein said forcing component means has sufficient force to bias a partially loaded/extracted film cartridge against said film cartridge chamber to prevent the film cartridge from falling out of said film cartridge chamber.

* * * * *

UNITED STATES PATENT AND TRADEMARK OFFICE
CERTIFICATE OF CORRECTION

PATENT NO. : 5,664,250
DATED : September 2, 1997
INVENTOR(S) : Tsutomu WAKABAYASHI It is certified that error appears in the above-indentified patent and that said Letters Patent is hereby corrected as shown below:

On the front cover, in item [56], please add the following Foreign Patent Documents:

| | | |
|---|---|---|
| 5-150343 | 6/1993 | Japan |
| 5-40298 | 2/1993 | Japan |
| 5-241234 | 9/1993 | Japan |

Signed and Sealed this

Twenty-third Day of December, 1997

Attest:

BRUCE LEHMAN

Attesting Officer

Commissioner of Patents and Trademarks